United States Patent Office 2,750,255
Patented June 12, 1956

2,750,255

PROCESS FOR RENDERING TITANIUM MINERALS AND ORES SOLUBLE IN ACIDS

Ellis E. Creitz, Tuscaloosa, Ala., and Henry G. Iverson, Minneapolis, Minn.

No Drawing. Application June 9, 1952,
Serial No. 292,596

7 Claims. (Cl. 23—51)

(Granted under Title 35, U. S. Code (1952), sec. 266)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to a process for treating titanium minerals and ores and more particularly to a process for rendering difficultly soluble titanium minerals soluble in acids.

Large deposits of ores containing titanium in various mineral forms exist throughout the world. Where the titanium exists in the ore in the form of ilmenite it is readily recoverable from the ore by acid leaching processes. However, in many titanium ores, such as those found in abundance in Florida and other parts of the world, the titanium occurs in the form of rutile, leucoxene, and other acid insoluble or difficultly soluble minerals. Rutile and leucoxene are almost completely insoluble in acids under the leaching conditions employed with ilmenite. Some ores contain titanium in the form of acid soluble and acid insoluble titanium materials. In order to economically treat these ores it has been the practice to separate the soluble titanium minerals from the less soluble titanium minerals prior to acid leaching. Separation operations, however, also are costly and time consuming and a large portion of the titanium in the ore is rejected.

Accordingly, an object of this invention is to provide a process for rendering difficultly soluble titanium minerals soluble in acids.

Another object of this invention is to provide a process for converting acid unreactive titanium minerals, such as rutile and other difficultly soluble minerals, to acid soluble compounds or complexes.

A further object of this invention is to provide a process for converting titanium-bearing non-ilmenitic material, such as rutile and others, to material having the same X-ray pattern and substantially the same solubility characteristics as ilmenite.

A still further object of this invention is to provide a process for converting difficultly soluble forms of titanium in mixtures with more soluble forms of titanium to a more soluble form of titanium whereby substantially the entire titanium content of the mixture may be recovered by acid leaching.

Other objects of the invention will appear from the following description and claims.

These objects are accomplished by heating the titanium minerals or materials in finely divided form with iron minerals or iron compounds, either naturally occurring with the titanium minerals or added thereto, with or without coke or other carbonaceous material, in a substantially non-oxidizing atmosphere or slightly reducing atmosphere containing carbon dioxide. By this method 85 to 98 percent of the $TiO_2$ in the difficultly soluble titanium minerals is rendered soluble in acids, as compared to 15 percent or less without such treatment.

According to one embodiment of the invention a finely ground mixture, preferably minus 200 mesh, of the unreactive titanium minerals and iron minerals or compounds, with or without coke, is sintered at a temperature within the range of from about 2100° F. to about 2500° F., in a substantially non-oxidizing atmosphere for a period of time usually less than 45 minutes and preferably for a period of from about 10 to 30 minutes. The sinter is cooled substantially without contact with air by immediately quenching it in water upon withdrawal from the furnace. The cooled sinter is broken into fine particle and is leached with an acid in a manner commonly known to those familiar with the art.

Suitable iron minerals or compounds for admixture with the titanium-bearing material are siderite, magnetite, titaniferous magnetite, hematite, limonite, FeS, pyrites, and others. Siderite or other minerals containing iron in ferrous form may be employed without coke in the sintering process. Materials containing iron in higher valence forms such as magnetite, limonite, and hematite, require addition of coke or other carbonaceous material to the admixture for best results. In some instances a small amount of FeS may also be included with the higher valence forms of iron and with the carbonaceous material to further improve the solubility of the titanium in the resulting sinter.

Although applicants are not bound by any theory of operation, it would appear that the iron in the minerals or compounds is in a reduced form, probably the ferrous form, or is converted to such form under the conditions of the process, in order for the solid reaction between the titanium minerals and the iron minerals or compounds to take place. The solid reaction occurring during the heating period apparently involves the combining of elemental iron or iron oxide with the titanium minerals in a chemical combination. Titanium material formed in the process exhibits both the X-ray patterns and solubility characteristics of ilmenite. Thus, the invention affords a method for producing synthetic ilmenite from rutile and other difficultly soluble titanium minerals.

From the above discussion, however, it is not to be construed that the high solubilities of $TiO_2$ in the product are necessarily limited to the formation of only ilmenite, or material having identical X-ray patterns to that of ilmenite. Good solubilities of $TiO_2$ are obtained on products which, by X-ray analysis, contain only approximately 10 to 20 percent of material giving the X-ray pattern of ilmenite and 20 to 90 percent of material giving the X-ray pattern of hematite or distorted hematite or magnetite.

The iron minerals or materials in the admixture of titaniferous material to be heat treated should be present in such proportions as to yield a product having a $TiO_2$ to Fe weight percent ratio in the range of from approximately one to four, i. e., 1 $TiO_2$ to 1 Fe to 4 $TiO_2$ to 1 Fe. Where the titanium ore contains iron within these limits no iron addition is necessary, although coke or other carbonaceous material may be added if it is necessary to convert the iron in the titaniferous ore to ferrous form. Where the iron content of the ore is below that required by the stated ratios, adjustment is made by the addition of iron containing material such as siderite, magnetite, hematite, limonite, and others as mentioned above.

The particle size of the material to be heat treated is an important factor in solubilizing the $TiO_2$. In general the raw materials, both titanium material and iron-bearing materials, should be ground to pass through a 200 mesh screen and in some instances to pass through a 325 mesh screen. The raw materials are ground separately or may be admixed and ground together. Coarser ground materials generally require higher temperatures, longer heating periods, or both to effect the same degree of conversion as when finer ground materials are used. After the heat treatment, the material may be reground to the same fineness as the original material prior to leaching with acids. However, grinding of friable sinters may be unnecessary as the porosity of the unground sinters permits a relatively high extraction of $TiO_2$ by acid leaching.

Although temperatures within the range of about 2100° F. to 2500° F. are preferred in carrying out the process of this invention, the temperatures are not limited thereto. Increase in the solubility of the titanium material may to some extent be realized by heating anywhere within the broad range of from above 200° F. up to that temperature at which the particular materials being treated will melt during the heating period, depending upon other conditions during the heating period. The solubility of the $TiO_2$ in the product will vary depending upon the amount of time the material is exposed to heat, the fineness of the particles of materials heated, the nature of the particular titanium and iron bearing materials being heated, the amount of admixed materials, and the type of admixtures employed. In general, the material should be heated at such temperature and for such a period of time as to form a sintered product. Hence, temperatures outside the preferred limits may be effective in rendering the $TiO_2$ in the product soluble in acids so long as the sintering or heating periods, and the fineness of the materials and other controlling conditions are properly adjusted. For example, with some difficultly soluble titanium materials or admixtures, flash heating at extremely high temperatures of 3000° F. or more for a few seconds or for a few minutes may give equally good results as those obtained at 2200° F. with 20 minute sintering periods. Also, excellent solubilities may be obtained of the $TiO_2$ in sinters prepared from the same materials in the same manner, but sintered or heated at furnace temperatures lower than 2200° F. for longer periods of time, for example, from a few hours to 24 hours or more. A 20 to 30 minute sintering period at temperatures within the range of 2100° F. to 2500° F. results in a product having a high $TiO_2$ solubility, when other conditions as set forth herein are observed.

The heating or sintering should be conducted in an atmosphere containing carbon dioxide. Slightly reducing conditions are beneficial. Sintering under oxidizing conditions, as in air, decreases the solubility of $TiO_2$ in the product. A slightly reducing atmosphere containing $CO_2$, with or without some carbon monoxide and minor amounts of oxygen, suitable for the purposes of this invention, can be readily maintained in commercial furnaces fired with artificial or natural gas, coal, coke or other carbon-containing fuels. In electric furnaces $CO_2$ from any suitable source may be passed over the charge being heated. Absolute absence of oxygen or air is unnecessary provided the atmosphere is predominantly $CO_2$ or is slightly reducing.

At the end of the sintering period the material is withdrawn from the furnace and is quickly quenched in water. This treatment is applied to avoid re-oxidation of the material. Other means, such as cooling in inert or reducing atmosphere, may be used in lieu of quenching.

The invention is further illustrated but is not limited by the following examples of practice. In carrying out the process in these examples, the samples were placed in open fire clay or ceramic dishes, which in turn were placed in a tube furnace that had been preheated to the temperature at which the material were to be sintered. The atmosphere used in sintering was commercial carbon dioxide passed into the interior of the furnace in contact with the material being sintered. At the end of the sintering period the samples were withdrawn from the furnace and quickly quenched in water. The solubility of the $TiO_2$ in the products was determined by sulfating and leaching the product and calculating the percentage recovery of $TiO_2$ in the leach solution as compared with the percentage of $TiO_2$ in the heat treated product, in a manner familiar to those practiced in the art.

The following Examples 1 and 2 give the percentage of $TiO_2$ solubilized in mixtures of difficultly soluble titanium minerals containing rutile, leucoxene and others, and ilmenite, by direct leaching and by sintering in $CO_2$ atmosphere without admixtures.

*Example 1*

Material containing about 79 percent $TiO_2$ and 12 percent iron was ground to minus 325 mesh and leached with 90 percent sulfuric acid. Only 52 percent of the total $TiO_2$ was solubilized.

*Example 2*

Similar material, fineness, and treatment as in Example 1, except that the ground minus 325 mesh material was sintered without any admixtures for 20 minutes at 2200° F. in $CO_2$ atmosphere and the sinter crushed through 48 mesh before leaching. Only 25 percent of the total $TiO_2$ was solubilized.

*Example 3*

This gives the resulting effects, as compared with Examples 1 and 2, of sintering similar material as used in Examples 1 and 2, also ground to minus 325 mesh but mixed with siderite in the proportions of 6 parts titanium material to 4½ parts of minus 325 mesh siderite before sintering. Otherwise the sintering conditions were the same as in Example 2, namely: temperature, 2200° F.; sintering time, 20 minutes; and $CO_2$ sintering atmosphere. Total $TiO_2$ solubilized was 91 percent, as compared to 52 percent in Example 1 and 25 percent in Example 2, in which no admixtures of iron minerals were used.

*Example 4*

This consisted of several tests utilizing material similar to that in Examples 1, 2, and 3. The tests were conducted in the same manner and under the same conditions as given in Example 3 except that the proportions of siderite to the titanium minerals were varied.

| Parts of titanium minerals | Parts siderite | Sintering conditions | | | Percent in sinter | | Percent of total $TiO_2$ solubilized |
|---|---|---|---|---|---|---|---|
| | | Time, minutes | Temp., °F. | Atmosphere | Fe | $TiO_2$ | |
| 6 | 2 | 20 | 2,200 | $CO_2$ | 21 | 65 | 62 |
| 6 | 2½ | 20 | 2,200 | $CO_2$ | 23 | 65 | 67 |
| 6 | 3 | 20 | 2,200 | $CO_2$ | 25 | 60 | 78 |
| 6 | 3½ | 20 | 2,200 | $CO_2$ | 27 | 58 | 85 |
| 6 | 4 | 20 | 2,200 | $CO_2$ | 28 | 55 | 85 |
| 6 | 4½ | 20 | 2,200 | $CO_2$ | 29 | 54 | 91 |
| 6 | 5 | 20 | 2,200 | $CO_2$ | 30 | 52 | 91 |

The data in the above example show how the solubility of $TiO_2$ in the sinter increased, under the conditions of trial, with increasing amounts of siderite up to 4½ parts, with 6 parts of titanium minerals.

*Example 5*

Rutile containing about 96 percent $TiO_2$ and about 1 percent iron was ground to minus 325 mesh and leached directly with 90 percent sulfuric acid. Only about 15 percent of the total $TiO_2$ was dissolved.

Example 6

Rutile as used in Example 5 was ground to minus 325 mesh and sintered without any admixtures for 20 minutes at 2200° F., 2250° F., and 2300° F. in $CO_2$ atmosphere. The amount of the total $TiO_2$ rendered soluble, in 90 percent sulfuric acid, in the ground sinters ranged from only 2 to 10 percent.

Example 7

Rutile as used in Examples 5 and 6 was ground to minus 325 mesh and mixed with minus 325 mesh siderite in the proportion of 6 parts of rutile to 8 parts of siderite, sintering the mixtures for 20 minutes at 2200° F. in $CO_2$ atmosphere. Ninety-two percent of the total $TiO_2$ in the ground sinter was now soluble in 90 percent sulfuric acid, contrasted to the 15 and 10 percent solubilities in Examples 5 and 6.

Example 8

This consisted of several tests utilizing rutile similar to that used in Examples 5, 6, and 7. The tests were conducted in the same manner and under the same conditions as given in Example 7, except that the proportions of siderite to rutile were varied. All sinters were crushed through 48 mesh before leaching in 90 percent sulfuric acid.

| Parts rutile | Parts siderite | Sintering conditions | | | Percent in sinter | | Percent of total $TiO_2$ solubilized |
|---|---|---|---|---|---|---|---|
| | | Time, minutes | Temp., °F. | Atmosphere | Fe | $TiO_2$ | |
| 6 | 3 | 20 | 2,200 | $CO_2$ | 17 | 72 | 45 |
| 6 | 5 | 20 | 2,200 | $CO_2$ | 23 | 62 | 70 |
| 6 | 7 | 20 | 2,200 | $CO_2$ | 27 | 55 | 82 |
| 6 | 8 | 20 | 2,200 | $CO_2$ | 31 | 49 | 92 |
| 6 | 8½ | 20 | 2,200 | $CO_2$ | 32 | 44 | 90 |

The data in the above example show how the solubility of the $TiO_2$ in 90 percent sulfuric acid increased, under the conditions of trial, with increasing amounts of siderite up to 8 parts of siderite to 6 parts of rutile. The maximum amount of $TiO_2$ dissolved was 92 percent.

Example 9

This consisted of several tests utilizing rutile similar to that used in Examples 5, 6, 7, and 8. The tests show the effect of varying sintering periods in sintering various proportions of minus 325 mesh siderite to minus 325 mesh rutile, thoroughly mixed before sintering. Sintering conditions were: time varied as shown in the following table; temperature, 2200° F., and $CO_2$ atmosphere. All sinters were crushed through 48 mesh before leaching in 90 percent sulfuric acid.

| Parts rutile | Parts siderite | Sintering conditions | | | Percent in sinter | | Percent of total $TiO_2$ solubilized |
|---|---|---|---|---|---|---|---|
| | | Time, minutes | Temp., °F. | Atmosphere | Fe | $TiO_2$ | |
| 6 | 7 | 20 | 2,200 | $CO_2$ | 29 | 54 | 82 |
| 6 | 8 | 20 | 2,200 | $CO_2$ | 31 | 49 | 92 |
| 6 | 8½ | 20 | 2,200 | $CO_2$ | 32 | 48 | 90 |
| 6 | 7 | 30 | 2,200 | $CO_2$ | 29 | 53 | 87 |
| 6 | 8 | 30 | 2,200 | $CO_2$ | 31 | 50 | 93 |
| 6 | 8½ | 30 | 2,200 | $CO_2$ | 32 | 49 | 98 |
| 6 | 7 | 40 | 2,200 | $CO_2$ | 29 | 54 | 91 |
| 6 | 8 | 40 | 2,200 | $CO_2$ | 31 | 51 | 98 |
| 6 | 8½ | 40 | 2,200 | $CO_2$ | 33 | 50 | 98 |

The above data showed that sintering mixtures of rutile and siderite for periods of 30 or 40 minutes under the conditions of trial may be advantageous, compared to the 20-minute sintering period, in that less siderite may be used for making equal or more soluble sinter, higher in $TiO_2$ content.

Example 10

This consisted of several tests utilizing rutile similar to that used in Examples 5 to 9, inclusive. The tests show the effects of using the following admixtures with rutile: magnetite; coke and magnetite; FeS, coke, and magnetite; and sintering at 2200° F. and 2300° F. All materials were ground to minus 325 mesh before sintering for 20 minutes in $CO_2$ atmosphere. All sinters were crushed through 48 mesh before leaching in 90 percent sulfuric acid.

| Parts rutile | Parts admixtures | | | Sintering temp., °F. | Percent in sinter | | Percent of total $TiO_2$ solubilized |
|---|---|---|---|---|---|---|---|
| | Coke | FeS | Magnetite | | Fe | $TiO_2$ | |
| 6 | --- | --- | 5½ | 2,200 | 35 | 51 | 25 |
| 6 | ½ | --- | 5½ | 2,200 | 35 | 51 | 31 |
| 6 | ½ | ½ | 5 | 2,200 | 35 | 54 | 87 |
| 6 | --- | --- | 5½ | 2,300 | 35 | 52 | 45 |
| 6 | ½ | --- | 5½ | 2,300 | 35 | 54 | 89 |
| 6 | ½ | ½ | 5 | 2,300 | 35 | 55 | 88 |

From the above data it is evident that sintering rutile with magnetite at either 2200° or 2300° F. for 20 minutes did not render the $TiO_2$ in the sinter highly soluble. The use of ½ part of coke under the conditions of trial did not materially affect the solubility of the $TiO_2$ at 2200° F., but greatly increased the solubility at 2300° F. Compared with admixtures of coke and magnetite, the use of ½ part of FeS with ½ part coke and 5 parts magnetite, with 6 parts rutile, was markedly effective in greatly increasing the solubility of $TiO_2$ in the sinter prepared at 2200° F., but was not more effective than coke at 2300° F.

Example 11

This consisted of several tests utilizing rutile similar to that used in Examples 5 to 10, inclusive. They give the effects of using the following admixtures with rutile: Hematite; coke and hematite; FeS, coke, and hematite; and sintering at 2200° F. and 2300° F. All materials were ground to minus 325 mesh before sintering in $CO_2$ atmosphere. Sintering period for all tests was 20 minutes. All sinters were crushed through 48 mesh before leaching in 90 percent sulfuric acid.

| Parts rutile | Parts admixtures | | | Sintering | | Percent in sinter | | Percent of total $TiO_2$ solubilized |
|---|---|---|---|---|---|---|---|---|
| | Coke | FeS | Hematite | Temp., °F. | Atmosphere | Fe | $TiO_2$ | |
| 6 | -- | -- | 5½ | 2,200 | $CO_2$ | 35 | 50 | 14 |
| 6 | ½ | -- | 5½ | 2,200 | $CO_2$ | 33 | 51 | 8 |
| 6 | ½ | ½ | 5 | 2,200 | $CO_2$ | 34 | 54 | 91 |
| 6 | -- | -- | 5½ | 2,300 | $CO_2$ | 33 | 51 | 24 |
| 6 | ½ | -- | 5½ | 2,300 | $CO_2$ | 34 | 54 | 83 |
| 6 | ½ | ½ | 5 | 2,300 | $CO_2$ | 34 | 54 | 85 |

From the above data it is evident that sintering rutile with hematite at either 2200° F. or 2300° F. for 20 minutes did not render the $TiO_2$ in the sinter highly soluble. The use of ½ part of coke under the conditions of trial did not materially affect the solubility of the $TiO_2$ at 2200° F., but greatly increased the solubility at 2300° F. Compared with admixtures of coke and hematite, the use of ½ part of FeS with ½ part coke and 5 parts hematite, with 6 parts rutile, was very effective in increasing the solubility of $TiO_2$ in the sinter prepared at 2200° F., but was not markedly effective at 2300° F.

Example 12

This consisted of several tests utilizing rutile similar to that used in Examples 5 to 11, inclusive, using the following admixtures with rutile: limonite; coke and limonite; FeS, coke, and limonite; and sintering at 2200° F. and 2300° F. All materials were ground to minus 325 mesh before sintering in $CO_2$ atmosphere. Sintering period for all tests was 20 minutes. All sinters were crushed through 48 mesh before leaching in 90 percent sulfuric acid.

| Parts rutile | Parts admixtures | | | Sintering | | Percent in sinter | | Percent of total $TiO_2$ solubilized |
|---|---|---|---|---|---|---|---|---|
| | Coke | FeS | Limonite | Temp., °F. | Atmosphere | Fe | $TiO_2$ | |
| 6 | -- | -- | 6 | 2,200 | $CO_2$ | 31 | 52 | 16 |
| 6 | ½ | -- | 6 | 2,200 | $CO_2$ | 31 | 52 | 24 |
| 6 | ½ | ½ | 5½ | 2,200 | $CO_2$ | 32 | 55 | 89 |
| 6 | -- | -- | 6 | 2,300 | $CO_2$ | 31 | 53 | 27 |
| 6 | ½ | -- | 6 | 2,300 | $CO_2$ | 31 | 55 | 88 |
| 6 | ½ | ½ | 5½ | 2,300 | $CO_2$ | 31 | 55 | 91 |

From the above data it is evident that sintering rutile with limonite at either 2200° F. or 2300° F. for 20 minutes did not render the $TiO_2$ in the sinter highly soluble. The use of ½ part of coke under the conditions of trial did not materially affect the solubility of the $TiO_2$ at 2200° F., but greatly increased the solubility at 2300° F. Compared with admixtures of coke and limonite, the use of ½ part FeS with ½ part coke and 5½ parts limonite was very effective in increasing the solubility of the $TiO_2$ in the sinter prepared at 2200° F., but was not markedly effective at 2300° F.

Example 13

This consisted of several tests which show that, on materials containing difficultly soluble titanium minerals and iron compounds in amount adequate to form soluble titanium-iron compounds, the solubility of the $TiO_2$ in such difficultly soluble mixtures may be greatly increased by merely heating the ground materials without any admixtures at elevated temperatures for short periods of time in $CO_2$ atmosphere. The titanium material involved in the tests contained about 46 to 49 percent $TiO_2$ and 22 to 24 percent Fe. All sinters were crushed through 48 mesh before leaching in 90 percent sulfuric acid. Test conditions and results are given in the following table:

| Mesh of material | Sintering conditions | | | Percent in sintering | | Percent of total $TiO_2$ solubilized |
|---|---|---|---|---|---|---|
| | Time, min. | Temp., °F. | Atmosphere | Fe | $TiO_2$ | |
| −200 | Not sintered[1] | | | 22 | 49 | 65 |
| −325 | Not sintered[1] | | | 24 | 47 | 66 |
| −200 | 20 | 2,200 | $CO_2$ | 23 | 49 | 90 |
| −200 | 20 | 2,250 | $CO_2$ | 23 | 50 | 90 |
| −200 | 20 | 2,300 | $CO_2$ | 23 | 49 | 89 |
| −325 | 20 | 2,200 | $CO_2$ | 24 | 47 | 96 |
| −325 | 20 | 2,250 | $CO_2$ | 24 | 47 | 96 |
| −325 | 20 | 2,300 | $CO_2$ | 24 | 47 | 97 |

[1] Material not sintered, hence, analyses and percent of soluble $TiO_2$ are given for original material.

Only 65 to 66 percent of the total $TiO_2$ in the material ground to minus 200 and minus 325 mesh was soluble in 90 percent sulfuric acid. At the same finenesses, the solubility of the total $TiO_2$ was increased to 90 and 96 percent, respectively, by merely heating the material without any admixtures to 2200° F. and 2300° F. in $CO_2$ atmosphere. Somewhat more $TiO_2$ was rendered soluble in material ground to minus 325 mesh than in material ground to minus 200 mesh. With the finer material, the 2200° F. temperature was as effective as 2300° F. in rendering an equally high amount of $TiO_2$ soluble.

Example 14

This includes several tests which give the sintering conditions under which titanium minerals, mixed with admixtures, were converted to ilmenite. The determinations of the mineral contents in the sinters were made from X-ray powder-patterns of the products. Sintering conditions that were the same for all tests shown were: temperature, 2200° F.; atmosphere, $CO_2$. Ninety percent sulfuric acid was used in determining the solubilities of the $TiO_2$ in the sinters. Two types of titanium-containing materials were used, namely, rutile containing about 96 percent $TiO_2$ and 1 percent iron, and a mixture of difficultly soluble titanium minerals similar to that used in Example 13. The rutile and admixtures were ground to minus 325 mesh before sintering. For the first sintering test shown on the mixture of titanium minerals, the material was ground to minus 200 mesh, and for the second test, to minus 325 mesh. No admixture was used in sintering the mixture of titanium minerals.

| Titanium materials | | Parts admix., siderite | Sintering time | Percent in sinter | | Percent of total $TiO_2$ solubilized | Percent in sinter determined from X-ray patterns | | |
|---|---|---|---|---|---|---|---|---|---|
| Material | Parts | | | Fe | $TiO_2$ | | Ilmenite | Rutile | Others |
| Rutile | 6 | 0 | 20 | 1 | 97 | 10 | -- | 100 | |
| Rutile | 6 | 7 | 20 | 27 | 55 | 84 | 90 | trace | trace. |
| Rutile | 6 | 8½ | 30 | 32 | 49 | 98 | 95 | -- | trace. |
| $TiO_2$ mineral mixtures. | Not sintered | | | 22 | 49 | 65 | 50 | 20 | Zircon and traces of others. |
| | No admix. | | 20 | 23 | 49 | 90 | 95 | trace | |
| | No admix. | | 20 | 24 | 47 | 96 | 95 | trace | |

The data in the above table show that sintering rutile alone yielded very low solubility of $TiO_2$ in the sinter and that the sinter contained only rutile. However, sintering under identical conditions a mixture of 6 parts rutile and 7 parts siderite greatly increased the solubility of the $TiO_2$ in the sinter, and 90 percent of the material in the sinter consisted of ilmenite or material which had the same X-ray pattern as ilmenite. Increasing the amount of siderite and sintering time resulted in a further increase in the solubility of $TiO_2$ and in the amount of ilmenite in the sinter.

The mixture of titanium minerals consisting of 50 percent ilmenite and 20 percent rutile was almost wholly converted to ilmenite by merely heating to 2200° F. for 20 minutes in $CO_2$ atmosphere.

Example 15

Rutile, in the preceding examples, was mainly all minus 325 mesh before sintering. A few tests were run to show that the fineness of the titanium-bearing minerals, as was partly shown on another material in Example 14, does not have to be limited to minus 325 mesh. Nor does the temperature have to be limited to 2200° F. Sintering was accomplished in $CO_2$ atmosphere. Sintering time for all tests was 20 minutes.

| Parts rutile | Parts of siderite admix. | Mesh of siderite and rutile | Sintering | | Percent in sinter $TiO_2$ | Percent of total $TiO_2$ solubilized |
|---|---|---|---|---|---|---|
| | | | Temp., °F. | Atmosphere | | |
| 6 | 3 | −400 | 2,100 | $CO_2$ | 78 | 70 |
| 6 | 5 | −325 | 2,200 | $CO_2$ | 62 | 70 |
| 6 | 5 | −200 | 2,200 | $CO_2$ | 57 | 77 |
| 6 | 7 | −325 | 2,200 | $CO_2$ | 55 | 82 |
| 6 | 7 | −200 | 2,200 | $CO_2$ | 54 | 82 |

The finer material, minus 400 mesh, required less siderite and a lower temperature to yield $TiO_2$ solubilities in the sinter comparable to those obtained on the coarser material with more siderite and higher temperature. With equal amounts of siderite, however, and 2200° F., the solubilities of the $TiO_2$ in sinters prepared from minus 200 mesh material were equal to those from sinters prepared from minus 325 mesh material.

From the above example and the foregoing examples, it is evident that the fineness of the material to be sintered, the amount and type of admixtures added, the amount and type of titanium minerals to be treated, the length of sintering periods, and the optimum sintering temperatures are factors that are all interrelated and interdependent, one on another. Being thusly interrelated, any one of the factors may be varied somewhat in forming high amounts of soluble $TiO_2$ in the sinters.

*Example 16*

To demonstrate the harmful effects of oxidation during sintering to the solubility of $TiO_2$ in the sinter, titanium-containing material similar to that used in Example 13 was mixed in the proportion of 6 parts titanium material to 1 part siderite, and placed in open crucibles or ceramic dishes, and heated to various temperatures in a muffle furnace while exposed to air. As was shown in Example 13, 65 percent of the $TiO_2$ could be leached from the untreated material; and by merely heating the material in $CO_2$ atmosphere to 2200° F., a high solubility of the $TiO_2$ in the sinter was obtained.

| Parts of $TiO_2$ mineral mixture | Parts of siderite admix. | Temp., °F. | Sintering time, min. | Percent $TiO_2$ in sinter | Percent of total $TiO_2$ solubilized | Minerals in sinter det'd from X-ray patterns | | |
|---|---|---|---|---|---|---|---|---|
| | | | | | | Ilmenite | Rutile | Hematite |
| 6 | 1 | 390 | 20 | 40 | 65 | x | x | x |
| 6 | 1 | 760 | 20 | 41 | 63 | x | x | x |
| 6 | 1 | 1,200 | 20 | 43 | 36 | x | x | x |
| 6 | 1 | 1,560 | 20 | 43 | 29 | ---- | x | x |
| 6 | 1 | 1,840 | 20 | 43 | 27 | ---- | x | x |

Despite the beneficial presence of some siderite ($FeCO_3$) from which $CO_2$ would be evolved at the higher temperatures, the ilmenite contained in the original material was entirely converted to rutile at 1560° F. There was also a considerable increase in the amount of hematite with increasing temperature due to the disassociation and oxidation of the iron oxide from the ilmenite.

Since many widely differing embodiments of the invention will occur to one skilled in the art, the invention is not limited to the specific details illustrated and described, and various changes may be made therein without departing from the spirit and scope thereof.

What we claim is:

1. A process for converting difficultly soluble titanium minerals to acid-soluble form comprising grinding the titanium minerals to pass a 200 mesh screen, mixing the finely divided titanium minerals with finely divided siderite to provide an admixture containing $TiO_2$ and Fe in a weight ratio within the range of from about one to about four, sintering the admixed materials at a temperature of from about 2100° F. to about 2500° F. for at least 10 minutes in a substantially non-oxidizing atmosphere containing carbon dioxide, and quenching the sintered material.

2. A process for converting difficultly soluble titanium minerals to acid-soluble form comprising grinding the titanium minerals to pass a 200 mesh screen, mixing the finely divided titanium minerals with a finely divided iron-bearing material in which iron is present in a higher valence form, to provide a $TiO_2$ to Fe weight ratio within the range of from about one to about four, adding carbonaceous material to the admixture, sintering the admixture at a temperature of about 2300° F. for at least 10 minutes in a substantially non-oxidizing atmosphere containing carbon dioxide, and quenching the sintered material.

3. The process of claim 2 in which the iron-bearing material is magnetite.

4. The process of claim 2 in which the iron-bearing material is hematite.

5. The process of claim 2 in which the iron-bearing material is limonite.

6. A process for converting difficultly soluble titanium minerals to acid soluble form comprising grinding the titanium minerals to pass a 200 mesh screen, mixing the finely divided titanium minerals with an iron-bearing material in which iron is present in a higher valence form to provide a $TiO_2$ to Fe weight ratio in the range of from about one to about four, adding carbonaceous material and FeS to the admixture, sintering the admixture at a temperature of from about 2100° F. to about 2500° F. for at least 10 minutes in a substantially non-oxidizing atmosphere containing carbon dioxide, and quenching the sintered material.

7. A process for converting rutile to material having substantially the same X-ray pattern and solubility characteristics as ilmenite comprising admixing finely divided rutile with finely divided siderite in proportions to provide a $TiO_2$ to Fe weight ratio in the range of from about one to about four, sintering the admixture in an atmosphere of carbon dioxide at a temperature of about 2200° F. for about 20 minutes, and quenching the sintered product.

References Cited in the file of this patent

UNITED STATES PATENTS

| | | |
|---|---|---|
| 2,197,085 | Stuart | Apr. 16, 1940 |
| 2,375,268 | Wyckoff | May 8, 1945 |
| 2,417,101 | Campbell | Mar. 11, 1947 |
| 2,445,377 | Wyckoff | July 20, 1948 |
| 2,453,050 | Turkett | Nov. 2, 1948 |
| 2,471,242 | Royster | Mar. 24, 1949 |
| 2,476,453 | Pierce | July 19, 1949 |
| 2,631,941 | Cole | Mar. 17, 1953 |

OTHER REFERENCES

Metals Transactions, vol. 185, December 1949, pages 909–914, article by Cole et al., Ti Dig.